United States Patent

[11] 3,597,084

[72] Inventor Frank Pagano
 Elnora, N.Y.
[21] Appl. No. 12,990
[22] Filed Feb. 20, 1970
[45] Patented Aug. 3, 1971
[73] Assignee Aero-Vac Corp.
 Troy, N.Y.

[54] DELTA T-BAR SPECTROMETER READOUT DEVICE
 10 Claims, 3 Drawing Figs.
[52] U.S. Cl. .................................................. 356/37,
 73/17 A, 73/25, 250/218
[51] Int. Cl. ..................................................... G01n 1/10
[50] Field of Search ........................................... 250/218;
 356/36, 37, 38, 201; 73/17 A, 25

[56] References Cited
UNITED STATES PATENTS
2,415,776 2/1947 Walton .......................... 73/17

Primary Examiner—Ronald L. Wibert
Assistant Examiner—Orville B. Chew, II
Attorney—Beveridge and DeGrandi ABSTRACT: Extreme small percentage portions of an atmosphere are separated by condensation on a transparent, thermally conductive wall held to a known temperature gradient between a higher fixed temperature and a lower fixed temperature. Collection of an illuminated condensation product on this surface is observed by photocell probe by optical means through the transparent surface to provide either a photoelectric signal proportional to the amount of condensate collected or an optically measurable value. Indications of the positions of condensate portions provide product identification by calibrating the positions along the gradient.

PATENTED AUG 3 1971    3,597,084
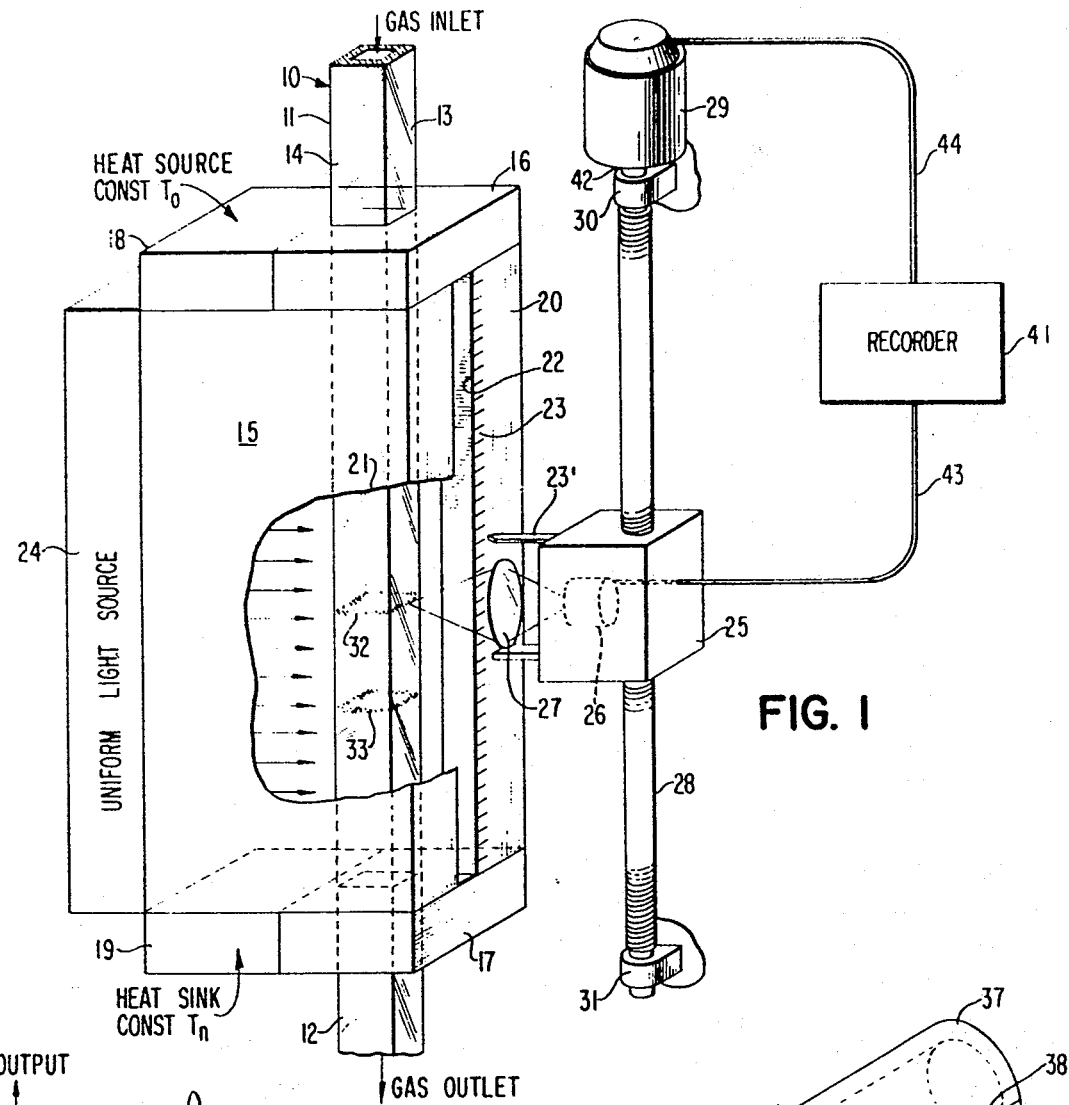
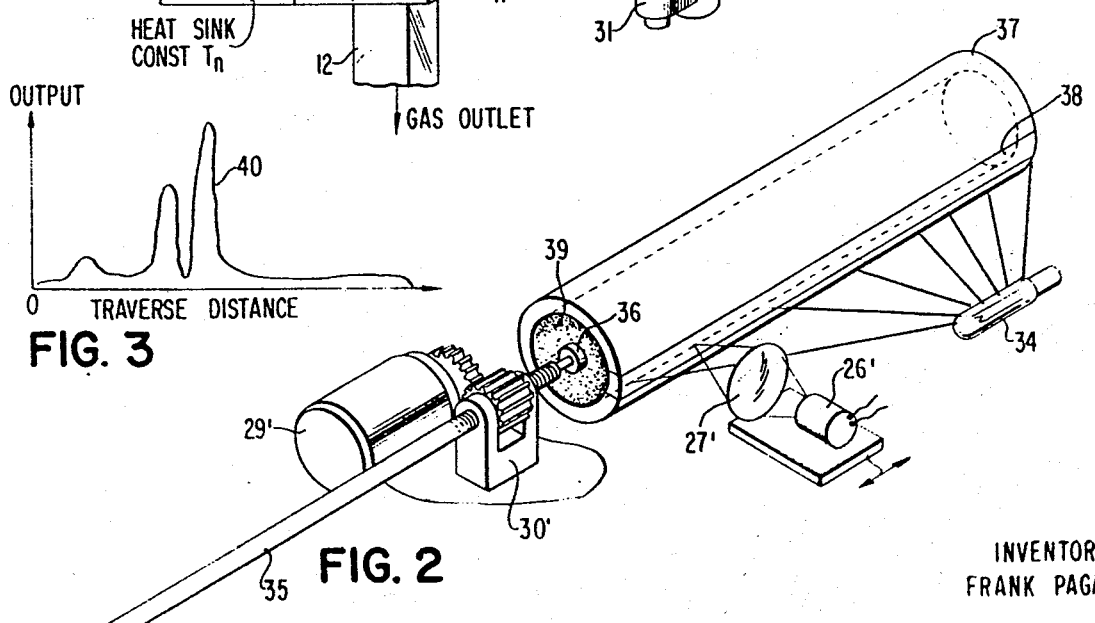
INVENTOR
FRANK PAGANO
BY Beveridge & DeGrandi
ATTORNEYS

DELTA T-BAR SPECTROMETER READOUT DEVICE

It has been proposed to monitor environmental space for atmospheric contaminants by causing selective condensation on a thermally conducting bar having one end at ambient temperature, and the other end at a controlled temperature below the freezing point for constituents of interest. Like principles are also applicable when the sample temperature is elevated and the gradient is wholly or partly above ambient temperature. A method and means for separating contaminants from an atmosphere and for analysis of the residual gases in a high vacuum system has been disclosed in a copending application of Donald J. Santeler entitled DELTA T BAR SPECTROMETER, filed Feb. 19, 1970, Ser. No. 12,602. This invention is an improvement on the device and method of that application.

Briefly summarized, the ΔT bar spectrometer with suitable controls of sample flow, dwell time, and radial diffusion is effective within a tube or along a surface, to separate into zones the various constituents of a simulated or natural atmosphere. It is also effective for analysis of the residual gases in a vacuum chamber having incidental contaminants such as hydrocarbons and other semipermanent gases originally present in the sample in minute quantities before evacuation even though much too sparce for detection. In analyzing the result of a freeze separation of the type disclosed in the aforesaid patent application it has been necessary to boil off the condensed products in succession by raising the condensing zone temperature, beginning at the lower temperature end, or to pass a carrier gas across the surface at a controlled temperature such that these constituents of the previous mixture are removed one-by-one for analysis purposes. This technique is somewhat cumbersome and is not always applicable to a particular equipment installation where continuous monitoring may be required.

It is accordingly an object of the present invention to provide a means for in place reading relative amounts of trace gases condensed out on a ΔT bar as a result of passing a sample therealong, and without the necessity for flushing or warming the object.

It is an object to provide for continuous monitoring of atmospheric contaminants and vacuum residuals.

It is also an object to provide a means for determining approximate quantities of constituents present without interrupting the continuous operation of a test chamber.

Other objects and advantages will become apparent as the description proceeds in connection with the following illustrations:

FIG. 1 is a diagrammatic showing of apparatus of this invention;

FIG. 2 shows alternative ΔT bar, light source and reading means; and

FIG. 3 illustrates an output signal from apparatus of FIG. 1 or FIG. 2.

The objects of this invention are achieved by the employment of a ΔT bar in the form of a sheet or tube of transparent material which has a thermal conductivity sufficient to maintain the desired temperature gradient uniformly therealong during the deposition of relatively small quantities of gaseous constituents. A readout optical system includes a source of light falling upon the surface and a detector arranged for movement therealong parallel to the length of the temperature gradient, preferably calibrated so that its focus is always at a surface of known temperature within the range of the gradient. Optical inspection may be alternatively by an observer who examines, according to calibrated positions, this transparent surface for light-reflective or light-absorptive material such as the droplets of a forming dew or the solid resulting from solidification of the condensate. Such a surface may be illuminated from the opposite side and observed by a traversing photocell connected to a recording apparatus to determine a profile of transparency or reflectivity at the transparent surface as the reader is moved along the bar throughout the temperature gradient region. A further readout mode consists of a probe mounted photocell entering the tube at the warm end and moved at a calibrated uniform rate down the inside of the tube facing a wall illuminated from one end or diffusely through a translucent wall. The wall may also be metallic and provided with a transparent window along one side, the metallic wall serving to more accurately govern a temperature gradient than is effectively achieved with a tube of glass or plastic composition.

Referring now to the drawings for a more detailed description of the invention there is shown in FIG. 1 a ΔT bar tube suitable for use in the apparatus described in the aforesaid application adapted for use according to the present invention. This tube, although illustrated as rectangular in cross section may be circular or otherwise and is sufficiently transparent to permit light to pass readily therethrough for measurement of differences in transparency in accordance with the varying deposit of condensed gases on the interior thereof. Tube 10 has input end 11 and output end 12 suitable for receiving a gas to be analyzed and for ejecting the gas remaining after condensation of the condensable portions, for example, leading to a vacuum system or to the ambient atmosphere is a carrier gas transports the sample of contaminants to be examined. For the purpose of this description the nature and form of the supply of the sample gas at 11 and its exhaustion at end 12 are not illustrated inasmuch as this invention is concerned with the means of read out of quantities and temperatures of condensation forming within tube 10.

Preferably tube 10 is formed with a flat face 13 on the side from which observation will occur and may have a similar surface 14 opposite thereto for receiving light from a suitable source.

Tube 10 is caused to enter a thermal chamber 15 in longitudinal alignment therewith having a high temperature reference surface comprising a relatively massive thermally conductive plate 16, and passes from the chamber at the opposite end through a low temperature reference plane established by a similar plate 17, plates 16 and 17 forming the respective ends of chamber 15. Heat exchanger means 18 is provided, such as a heat source, at constant temperature for maintaining the temperature of plate 16 at a desired upper temperature $T_o$. A similar heat exchanger device 19 controls lower temperature $T_n$ of plate 17 and usually in the form of a heat sink. Heat exchanger 18 may have a constant temperature at or below ambient temperature as well as above. Heat exchanger 19 may be controlled to a temperature such as of boiling liquid nitrogen, or may be regulated by a water bath as at ambient temperature, depending upon the temperature desired for plate 16 at the hot end and the thermal gradient limits desired between plate 16 and 17. Chamber 15 has surrounding walls 20 which are preferably insulated in order to better maintain a temperature gradient between plates 16 and 17 which is uniform and little disturbed by surrounding material. In one form chamber 15 comprises heavy walls of a vacuum chamber of which forward and rear walls are at least partially transparent in order to facilitate uniform illumination of tube surface 14 and to permit observation of wall 13 from the opposite side. Chamber 15 may also be a solid block of a thermal insulating material having transparent portions, or entirely transparent, through which tube 10 passes, walls 20 being outer surfaces.

At 21 is shown a portion of surfaces 20 broken away in order to show the relationship between an observing slot 22 in the face of 15, the front face 13 of the ΔT bar tube and the source 24 of uniform illumination on wall 14. Conveniently, slot 22 may be of glass or plastic when 15 is a box and has along the edge thereof calibration markings 23 cooperating with index pointer 23' marking the position of a detector 25, later described.

While it will be understood that a thermally conductive transparent tube 10 illuminated as by source 24 may be observed optically through slot 22, or an equivalent transparent wall of 15, in a number of different ways, there is illustrated in FIG. 1 a detector box 25 containing a photocell 26 having associated therewith a lens 27 for focusing light from surface 13 upon photocell 26.

In order to make a quantitative reading along the uniform temperature gradient precise and indexed in time on a recording proportional to distance along the ΔT bar there is provided motor means for producing uniform motion of box 25 in a direction parallel to the length of tube 10. For this purpose threaded shaft 28, supported by threadless collars 30 and 31, engages box 25 in a conventional manner for movement at a uniform rate by motor 29. When a recorder 41 is connected by leads 43 automatically register changes of light transmission through tube 10, or of light reflection therefrom, it is preferably driven as at 42 by motor 29 so as to provide a time scale calibrated in degrees between the two reference temperatures $T_o$ and $T_n$. This provides identification of each zone of condensation according to temperature, an example being shown at 40 in FIG. 3.

FIG. 2 illustrates an alternative tube portion of an apparatus as shown in FIG. 1, wherein the tube is shown as circular and of thermally conductive metal, which provides a higher degree of conductivity to supply better control of ΔT than is possible when tube 10 is of various conductive plastic materials. Tube walls 37 may pass through plates 16 and 17 in the same manner as in FIG. 1, maintaining good thermal contact therewith. A metallic tube which receives its condensation deposits internally is not observable optically from the side as in FIG. 1, and is preferably supplied with a transparent window 38 along one side. Internal illumination may be from a similar opposite window as in FIG. 1 or by light entering one or both ends or from the front to impinge upon a light-diffusing surface shown at 39.

A light source 34 may be employed to illuminate the transparent window 38 from the front, in which light is reflected from the condensate to lens 27' and photocell 26' as the condensed gas rings or zones appear on the inner wall, or may represent absorption of transmitted light reflected from surface 39 when window 38 is essentially clear. Thus, the rings may be either dark because of absorption of transmitted light or bright because of reflected light, depending upon illumination.

Scanning of a series of condensation zones on tube 10 or tube 37 may be accomplished in other ways than as illustrated in FIGS. 1 and 2 to obtain a profile as at 40 of FIG. 3. Particularly, if tube 37 is of metal and therefore opaque through illumination and recording of transmitted light absorption zones may be prevented. Readout of vastly enriched samples by conductive temperature gradient bar condensation into zones may still be practiced by electronic scanning in lieu of optical scanning. This is achieved by use of a photocell traversible along the interior of tube 37, photocell 36 being of a type to read radially therearound as the photocell is advanced along the tube axis by supporting shaft 35 driven by motor 29' and concentrically supported in threaded collar 30'. In this case, illumination may be via window 38 from source 34 of by placing a suitable like source at one or both ends of tube 37 to illuminate the zones of condensation therein.

Generally similar readout means is achieved if tube 10 is replaced by a thermally conductive bar and an insulated passage thereabout, the zones of condensation being observed by reflected illumination via an observing slot such as 22, incident light being preferably entrant from the face of the ΔT bar as when tube 37 has no window 38 and light from 34 is reflected by the front face of the ΔT bar, condensation rings being exterior thereto and 37 being stopped at one or both ends so that the sample gas passes along the exterior from 16 to 17 within an insulated hollow region of chamber 15.

I claim:

1. In device for concentrating over a period of time trace quantities of gaseous constituents of an atmosphere for measurement in more concentrated form wherein the trace constituents are cumulatively condensed in zones on a surface cooled to a predetermined temperature gradient according to vapor pressures thereof, respectively, thermally conductive tube means thermally insulated from the ambient atmosphere, first heat exchange means for establishing a first reference temperature at one portion of said tube means, second heat exchange means for establishing a second reference temperature below said first temperature at a second portion of said tube means, a transparent wall portion in said tube means extending between said first and second portions, and means illuminating said wall portion and any zoned condensate thereon to provide optically observable zones of condensation therealong.

2. In a device according to claim 1, said tube means being transparent and said means illuminating said wall portion being a source of illumination transmitted through the tube for selective absorption by said condensate.

3. In a device according to claim 1 a photocell and means for recording variations of light passing through said wall portion and means causing the photocell to traverse the length of said wall portion to provide sequential readout of respective quantities of condensate according to gas quantities.

4. In a device according to claim 1, means for generating a signal proportional to light absorbed in respective zones of condensate in succession, means for causing uniform traversal of the transparent wall portion and means for recording the magnitude of said signal as a function of the temperature of condensation of gases in said zones, respectively.

5. In a device according to claim 1, said means illuminating said wall portion being a source of uniform back lighting, said tube means being transparent, and means traversible along said tube between said first and second portions for detecting differences in light transmitted through the tube corresponding to zones of condensation for said constituents.

6. In a device for selective concentration of gases in zones from a sample supplied at a first temperature by passing said sample along a thermally conductive body held between said first temperature at one end and a lower temperature at the other end to provide a temperature gradient therealong encompassing condensation temperatures for each of said gases at the prevailing partial pressures, means insulating said body from heat sources and heat sinks between the regions at said temperatures, means conveying said samples along said body from one temperature region to the other, to cause selective zones of condensation, source means for illuminating said zones of condensation, means for detecting light from said zones, means traversing said detecting means along the length of said body to successively detect light in said zones, and means recording light as a function of the zones of condensation on the body.

7. In a device according to claim 6, said body being a metallic conductor of heat.

8. In a device according to claim 6 said detecting means being a photocell traversed along the body and operatively connected to record zones of condensate as a function of distance of traverse between a first and second said temperature.

9. In a device according to claim 6, said body being a metallic tube having a transparent window along one side, and said source means being arranged to illuminate said window exteriorly.

10. In a device according to claim 6, said means for detecting light being a photocell arranged to traverse the tube axially.